United States Patent
Clauer et al.

(10) Patent No.: US 6,521,860 B2
(45) Date of Patent: Feb. 18, 2003

(54) BEAM PATH CLEARING FOR LASER PEENING

(75) Inventors: Allan H. Clauer, Worthington, OH (US); Steven M. Toller, Grove City, OH (US); Jeffrey L. Dulaney, Dublin, OH (US)

(73) Assignee: LSP Technologies, Inc., Dublin, OH (US)

( * ) Notice: Subject to any disclaimer, the term of this patent is extended or adjusted under 35 U.S.C. 154(b) by 19 days.

(21) Appl. No.: 09/952,968

(22) Filed: Sep. 13, 2001

(65) Prior Publication Data

US 2002/0008087 A1 Jan. 24, 2002

Related U.S. Application Data

(62) Division of application No. 09/253,156, filed on Feb. 19, 1999, now Pat. No. 6,359,257.

(51) Int. Cl.[7] ............................................. B23K 26/00
(52) U.S. Cl. ............................. 219/121.6; 219/121.84; 219/121.85; 219/121.61; 219/121.62
(58) Field of Search .................. 219/121.6, 121.84, 219/121.85, 121.61, 121.62

(56) References Cited

U.S. PATENT DOCUMENTS

| 3,866,398 A | | 2/1975 | Vernon, Jr. et al. | |
|---|---|---|---|---|
| 4,401,477 A | * | 8/1983 | Clauer et al. ................ | 148/4 |
| 6,084,202 A | * | 7/2000 | Okazaki et al. ......... | 219/121.61 |

FOREIGN PATENT DOCUMENTS

| JP | 410251743 A | 9/1998 | ............ C21D/1/09 |
|---|---|---|---|

* cited by examiner

Primary Examiner—M. Alexandra Elve
(74) Attorney, Agent, or Firm—Randall J. Knuth (57) ABSTRACT

An apparatus and method for providing a substantially debris-free laser beam path for use during laser shock processing. The method and apparatus include a system for removing debris from the laser beam path and a system for preventing debris from entering the laser beam path.

10 Claims, 8 Drawing Sheets

BEAM PATH CLEARING FOR LASER PEENING

This case is a divisional of co-pending U.S. patent application Ser. No. 09/253,156, filed Feb. 19, 1999, now U.S. Pat. No. 6,359,257.

BACKGROUND OF THE INVENTION

1. Field of the Invention

The present invention relates to the use of coherent energy pulses from high powered lasers used in laser shock processing of solid materials, and more particularly, to an apparatus and method for clearing or providing a substantially debris free laser beam path during laser shock processing.

2. Description of the Related Art

Laser shock processing involves directing a pulse of coherent radiation to a piece of solid material to produce shock waves therein. The produced shock wave cold works the solid material to impart compressive residual stresses within the solid material. These compressive residual stresses improve the fatigue properties of the solid material.

Current laser shock processing utilizes two overlays: a transparent overlay (usually water), and an opaque layer (usually an oil based paint or black plastic tape). During processing, the laser beam is directed to pass through the transparent overlay and is absorbed by the opaque overlay, causing a rapid vaporization of the opaque overlay (plasma creation) and a generation of a high-amplitude shock wave. The shock wave cold works the surface of the part and creates deep compressive residual stresses, which provide an increase in fatigue properties of the workpiece. A workpiece is typically processed by processing a matrix of overlapping spots that cover the fatigue critical zone of the part.

During laser shock processing, some transparent and opaque overlay material becomes dislodged from the workpiece to form particulate matter or debris scattered through the gas surrounding the workpiece. Depending on the composition of the overlay material, the debris may be water droplets, water vapor, paint, or tape fragments. After a laser shot, the presence of debris expands to fill the environment which also contains the laser beam path and optics for the next laser shot. The debris or particulate matter within the laser beam path absorbs and scatters energy from the laser pulse.

One problem with current laser shock processing systems is that the presence of debris from previous laser shock processing cycles may interfere with the laser pulse of subsequent laser shock processing cycles. The debris or particulate matter residue located in the laser beam path absorbs and scatters energy from the laser pulse. As a result, there is an energy loss from the laser beam associated with the presence of debris within the laser beam path. Consequently, the amount of energy applied to the opaque layer is altered, and thereby, affects the amount of energy applied to the workpieces.

Another problem with the current system of laser shock processing is the increase in the density of debris or particulate matter within the laser beam path as the repetition rate of laser peening increases. In other words, there is a cumulative effect of debris residue present in the laser beam path when the pulse rate exceeds the time it takes for the debris to settle naturally out of the laser beam path.

Following a laser shock peening cycle, particulate matter or debris dislodged from the workpiece will settle over time. Typically, within four seconds, the debris will naturally settle from the laser beam path due to gravity. When the pulse repetition rate is ¼ hertz or greater, there is insufficient time for the debris to settle from the laser beam path. At increasing repetition rates above ½ hertz, the cumulative effect of particulate matter or debris results in an ever-increasing loss of laser pulse energy due to the debris accumulation in the beam path. As a result, current laser shock processing systems are limited to repetition rates of approximately ¼ hertz. Significant absorption and scatter of energy by the debris is not observed at these slower processing rates.

What is needed in the art is an apparatus and method for preventing debris or particulate matter from previous laser shock peening cycles from interfering with the laser beam path of subsequent laser shock peening cycles.

SUMMARY OF THE INVENTION

The present invention provides an apparatus and method for laser shock peening having a substantially debris-free laser beam path. In one embodiment, the invention includes a system for removing debris from the laser beam path. In an alternate embodiment, the present invention includes a system for preventing debris from entering the laser beam path.

The invention, in one form thereof, is an apparatus for improving the fatigue life of a workpiece. A laser is operatively associated with the workpiece. A laser beam path runs from the laser to the workpiece. A laser beam clearing means provides a substantially debris-free laser beam path.

The invention, in another form thereof, is an apparatus for improving the fatigue life of a workpiece through laser shock processing which limits laser shock processing debris from interfering with a pulse of coherent energy. A laser is operatively associated with the workpiece. A laser beam path runs from the laser to the workpiece. A shield prevents the laser shock processing debris from entering the laser beam path.

The invention, in yet another form thereof, is a method for providing a substantially debris-free path during laser shock processing. The method includes applying a transparent overlay to a workpiece. A substantially debris-free laser beam path is provided. A first laser pulse is directed to a workpiece. A second laser pulse is directed to a workpiece along the substantially debris-free laser beam path within four seconds of the first laser pulse.

One advantage of the present invention is the removal of debris or the prevention of debris entering into the laser beam path. The presence of debris within the laser beam path interferes with a pulse of coherent energy by absorbing and scattering energy from the laser pulse.

The invention, in another form thereof, is a method of cleaning a laser beam path of debris. The method includes the steps of directing a laser pulse to a workpiece and directing a flow of gas to remove debris from the laser beam path.

Another advantage of the present invention is the ability to increase the laser shock peening repetition rate. Prior to this invention, the repetition rate for a laser used in laser shock peening was limited due to the presence of debris within the laser beam path from previous cycles. Before one was able to fire the laser again, one had to wait for the debris caused by the previous firing cycle to naturally settle from the laser beam path. As a result, the repetition rate was limited to the time it takes for debris to naturally clear or settle from the laser beam path. The present invention either prevents debris from entering the laser beam path or removes debris that has entered the laser beam path. As a result, the present invention repetition rate is not limited due to debris from a previous laser shock peening cycle being present in the laser beam path.

Yet another advantage of the present invention is the ability to use a lower powered laser. Since the present invention provides a laser beam path substantially free from debris, there is substantially no debris to absorb and scatter energy from a pulse of laser energy. As a result, ever increasingly larger lasers are not needed in laser shock processing to overcome the effect of residue debris within a laser beam path.

Another advantage of the present invention is the achievement of more consistent results of compressive residual stresses imparted to a workpiece. The presence of debris within the laser beam path absorbs and scatters energy from the laser pulse. As a result, energy is lost from the laser pulse. Depending on the quantity of debris present in the laser beam path, the amount of energy lost will vary. The variability of energy loss, due to debris, affects the consistency of and reproducibility of compressive residual stress applied to a workpiece. The present invention allows for consistent compressive residual stresses applied to a workpiece by providing a predictable and consistent amount of energy applied to an opaque layer to form compressive residual stresses in the workpiece.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 6b is a front perspective view of the plurality of annularly disposed tubes of FIG. 4a;

DETAILED DESCRIPTION OF THE INVENTION

The improvements in fatigue life produced by laser shock processing are the result of residual compressive stresses developed in the irradiated surface retarding fatigue crack initiation and/or slowing the crack propagation rate. A crack front is the leading edge of a crack as it propagates through the solid material. Changes in the shape of a crack front and slowing of the crack growth rate when the crack front encounters the laser shocked zone in a laser shock processing condition have been shown. Laser shock processing is an effective method of increasing fatigue life in solid workpieces by treating fatigue critical regions.

For a more thorough background in the prior history of laser shock processing and that of high power processing of engineered materials, reference can be made to U.S. Pat. No. 5,131,957. Such patent is hereby incorporated by reference. This patent also shows a type of laser and laser circuit adaptable for use with the present invention. Another type of laser adaptable for use with the present invention is that of a Nd-Glass laser manufactured by LSP Technologies, Inc. of Dublin, Ohio.

Overlays are applied to the surface of the target workpiece being laser shock processed. These overlay materials may be of two types, one transparent to laser radiation and the other opaque to laser radiation. They may be used alone or in combination with each other, but it is preferred that they be used in combination with opaque layer adjacent the workpiece and the outer transparent layer being adjacent the opaque layer.

Debris within the laser beam path affects laser shock processing. The debris absorbs and scatters energy from a pulse of coherent energy. Depending on the density of particulate matter or debris present in the laser beam path, a varying amount of energy will be lost. As a result, the amount of energy absorbed by the opaque layer will vary depending on the quantity of particulate matter present in the laser beam path.

The repetition rate of a laser used in laser shock processing previously has been limited to ¼ hertz or less. At this rate, most particulate matter that may enter the laser beam path will clear naturally without additional assistance. When the repetition rate increases, such as above ¼ hertz, the effect of debris within the laser beam path becomes noticeable. As the repetition rate increases above two hertz, the effect of debris is ever increasingly observed. With the higher repetition rates, there is not sufficient time for the debris to settle before the laser fires again. As a result, debris from previous cycles will be present in the laser beam path for a subsequent laser firing.

The present invention is directed at providing a clear laser beam pathway. The present invention discloses two means of providing a clear laser beam pathway. One is to remove any debris from the laser beam path such that the path is clear when a pulse of coherent energy is sent from a laser to a workpiece. The second is to use a shield or other means of preventing debris from entering the laser beam path. In addition, both methods may be used in concert with one another.

The problem of debris from previous laser shock peening cycles interfering with subsequent laser shock peening cycles has not been previously documented or observed. This is due to the fact that the repetition rate of current lasers used in laser shock peening operate at approximately ¼ hertz or less. At such a slow firing rate, the negative effects of debris are not always observed. Studies of the length of time required for visible debris to clear the beam path showed that approximately four seconds were required. This will allow a maximum laser repetition rate of only ¼ hertz before debris energy absorption becomes a problem in laser peening.

This debris effect is also not observed in faster firing rate lasers of 10 hertz or more, used in other applications other than laser shock peening since their lasers operate at much lower power, and the debris is not ejected far enough back along the laser beam path to cause undesirable energy absorption effects. Without use of this invention, lasers of the power necessary for laser shock peening at a repetition rate of greater than ¼ hertz, will show the effect of debris from a previous laser shock cycle on a subsequent laser shock cycle.

During laser shock processing, debris from the overlay material usually becomes dislodged from the workpiece. This debris emanates from a workpiece and enters any void present between the workpiece and extending toward the laser. As a result, some debris may enter the laser beam path.

Figure 1A:
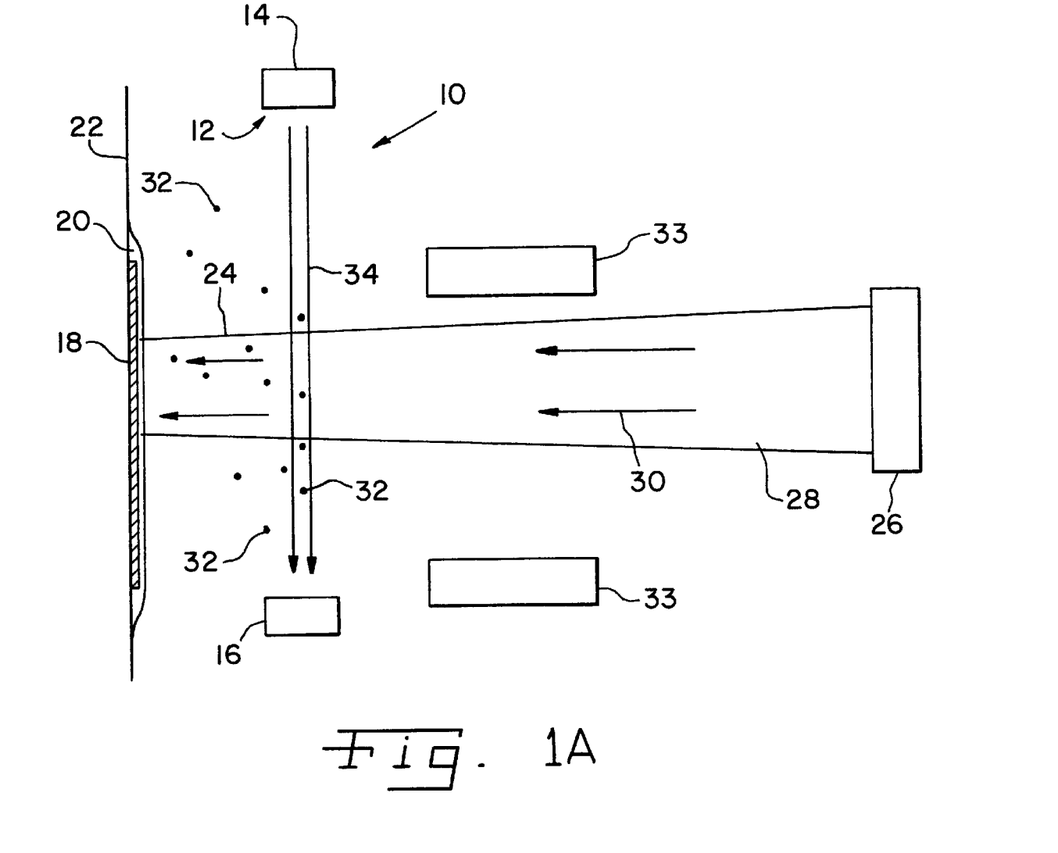
FIG. 1a is a cross-sectional, diagrammatic view of a laser beam path clearing system of the present invention.
Figure 1B:
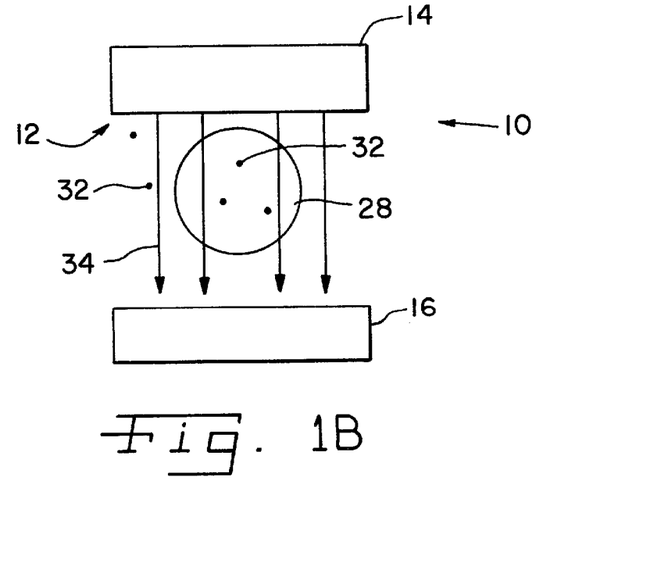
FIG. 1b is a cross-sectional view through a laser beam path clearing system of the present invention.

Referring now to the drawings, particularly to FIGS. 1a and 1b, there is shown components of one embodiment of the laser beam path clearing means 10 of the present invention. In the embodiment depicted in FIG. 1, laser beam clearing means 10 comprises gas knife 12. Gas knife 12 includes gas source 14 and an exhaust port 16.

Opaque overlay 18 and transparent overlay 20 are applied to workpiece 22. A beam of coherent energy or laser pulse 24 is directed from laser 26 along laser beam path 28 through transparent overlay 20 and is absorbed by opaque layer 18. The direction of laser pulse 24 is indicated by arrow 30.

During laser shock processing, the laser pulse 24 is absorbed by opaque layer 18 which is quickly vaporized, producing a plasma. The plasma is confined by the transparent overlay 20 resulting in a pressure pulse applied to workpiece 22. The pressure pulse creates a shockwave within workpiece 22 which imparts deep compressive residual stresses within workpiece 22.

When opaque layer 18 is hit with a laser pulse 24, particulate matter or debris consisting of pieces of opaque layer 18 and transparent layer 20 may become dislodged from workpiece 22. The debris 32 is composed of the constituents of opaque layer 18 and transparent layer 20. Therefore, debris 32 may consist of paint, tape, water particles, and/or water vapor. Debris 32 tends to expand outward from workpiece 22 to fill the void between workpiece 22 and laser 26, which includes laser beam path 28.

Gas knife 12 removes debris 32 from laser beam path 28. Gas source 14 supplies gas 34 across laser beam path 28. Gas 34 is preferably dry air but may also be nitrogen, argon, xenon, helium, as well as many others. As gas 34 traverses the space between gas source 14 and an exhaust source, exhaust port 16, gas 34 carries along with it, debris 32. Debris 32 is then evacuated from laser beam path 28 through exhaust port 16.

In one particular embodiment, gas 34 is filtered and its humidity is controlled. Filtering the gas ensures that the gas supplied through gas source 14 is free of debris whereby helping to maintain a clear laser beam path 28. Gas 34 may also be dehumidified. The dehumidified gas has a larger capacity to remove moisture or tiny water particles that may be present in debris 32. The means by which gas 34 is filtered may include, but not limited to, passing gas 34 through a HEPA filter or an electrostatic precipitator.

Gas knife 12 may operate with exhaust port 16 being connected to a vacuum source, or exhaust fan, (not shown) to apply negative pressure to assist in the removal of debris 32. Also, while gas 34 is depicted as being substantially perpendicular to laser beam path 28, gas 34 needs only to cut across laser beam path 28. Therefore, gas 34 may be at any angle greater than 0 degrees and less than 180 degrees whereby allowing gas 34 to traverse laser beam path 28.

The laser beam clearing means 10 may also consist separately or in conjunction with gas knife 12, electrostatic plates 33. The laser beam path 28 passes between electrostatically charged electroplastic plates 33. Depending on the charge of electrostate plates 33 and the electrostatic charge of the debris 32, debris 32 will be removed from laser beam path 28 by being attached to, or repelled from, electrostatic plates 33.

Figure 2:
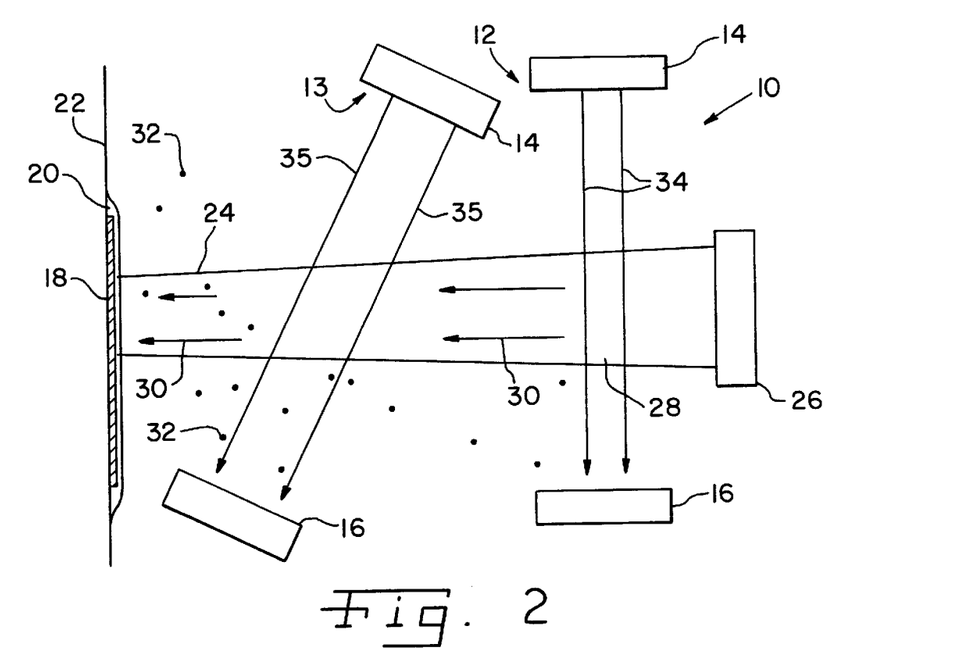
FIG. 2 is a cross-sectional, diagrammatic view of one embodiment of a laser beam path clearing system of the present invention.

The laser beam clearing means 10 may comprise two gas knives (FIG. 2). In the embodiment shown in FIG. 2, the first gas knife 12 is directed substantially perpendicular to laser beam path 28. A second gas knife 13 is directed at an angle less than 90 degrees to the laser beam path 28. While the flow of gas 35 from gas knife 13 is depicted as traversing laser beam path 28 at an angle of 65 degrees, the angle may be any angle less than 90 degrees and greater than zero degrees.

During the operation of this embodiment, gas knife 13 directs a flow of gas diagonally across laser beam path 28 and toward workpiece 22. After the laser beam irradiates the overlays 18 and 20, debris 32 emanates from workpiece 22 and is propelled toward laser 26. As gas 35 traverses laser beam path 28, the flow of gas 35 removes debris 32 from laser beam path 28 and retards the movement of debris 32 toward laser 26. Gas knife 12 further removes debris 32 from laser beam path 28.

Figure 3:
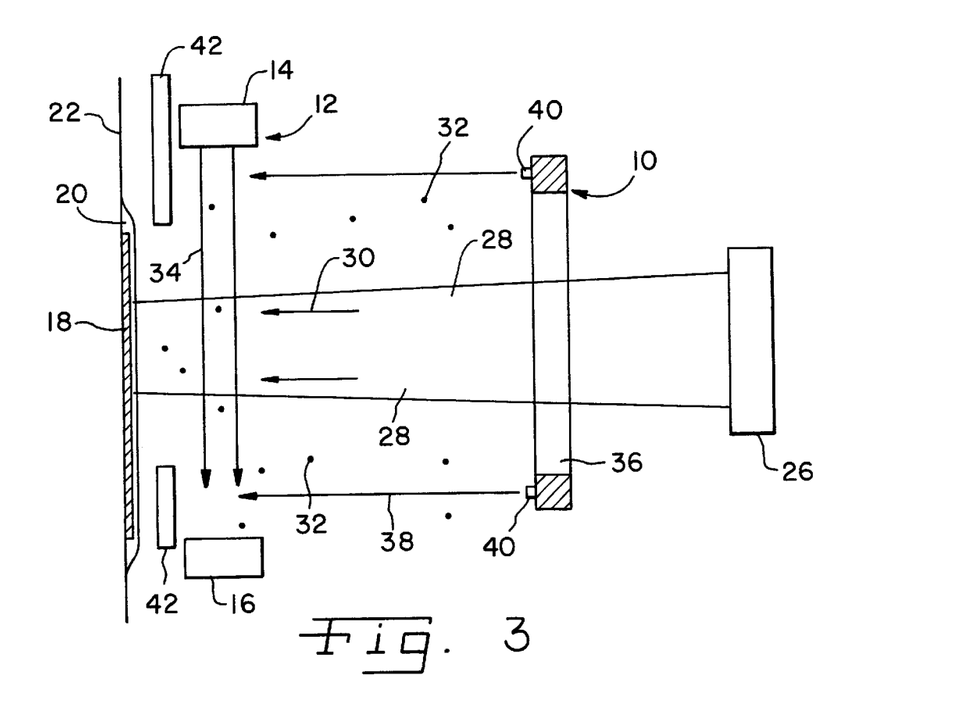
FIG. 3 is a cross-sectional, diagrammatic view of another embodiment of a laser beam clearing means comprising an annular member of the present invention.

FIG. 3 depicts an alternate embodiment of the present invention in which laser beam clearing means 10 comprises annular member 36. Annular member 36 produces gas column 38 annularly disposed around laser beam path 28. The column of gas 38 is supplied through a plurality of annularly disposed apertures 40 (best shown in FIG. 4). Gas column 38 exits through exhaust vent 42. Exhaust vent 42 may be connected to a vacuum supply or exhaust fan (not shown) for assisting in the removal of gas. While FIG. 3 depicts gas column 38 to be in the same direction as laser beam path 30, gas column 38 can run opposite of the direction of laser beam path 30.

Figure 4:
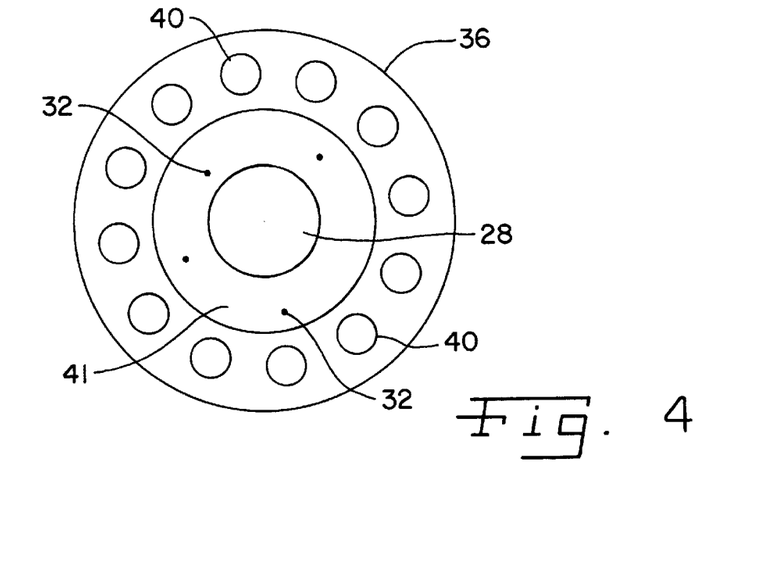
FIG. 4 is a front perspective view of the annular member of FIG. 2.

Referring now to FIG. 4, there is shown a front view of annular member 36. Annular member 36 consists of annularly disposed annular apertures 40 and center aperture 41. Gas is supplied through annular apertures 40 and laser beam path 28 traverses center aperture 41. Gas knife 12 may be used in conjunction with the gas column 38 to assist in the removal of debris 32 from laser beam path 28.

Figure 6A:
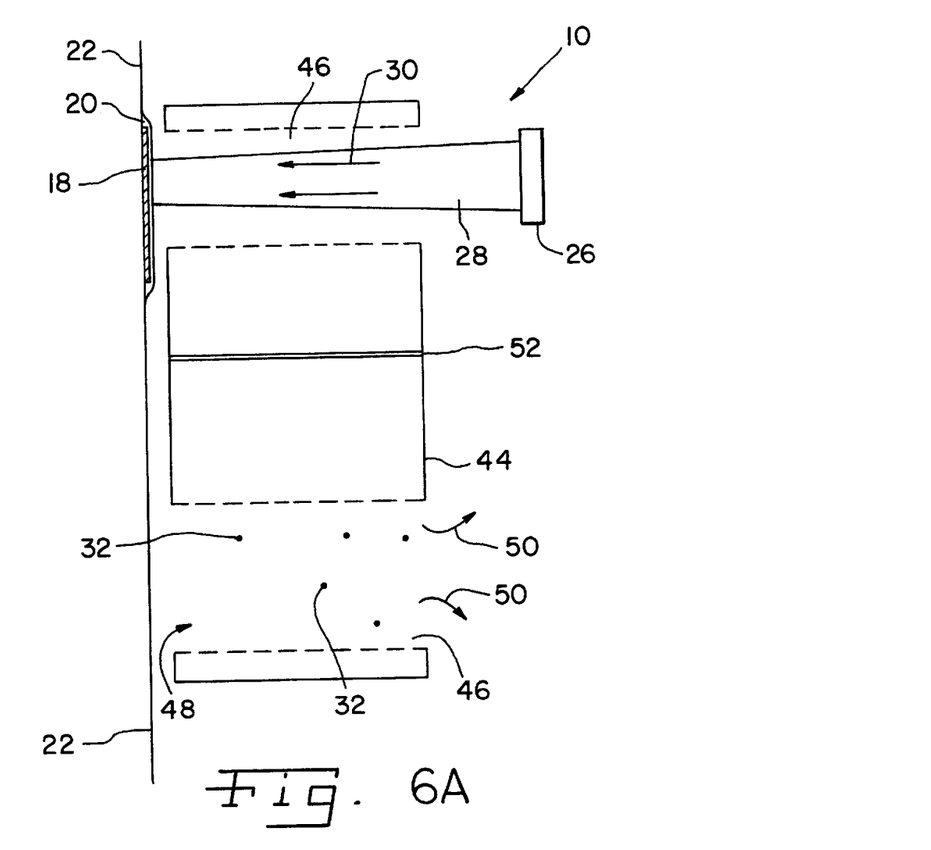
FIG. 6a is a cross-sectional, diagrammatic view of a laser beam path and laser beam clearing means depicted as a plurality of annularly disposed tubes.

During the operation of this invention, gas column 38 clears laser beam path 28 of debris 32. Column of gas 38 pushes debris-laden gas along the laser beam path 28 and into exhaust vent 42 (FIG. 6).

Figure 5:
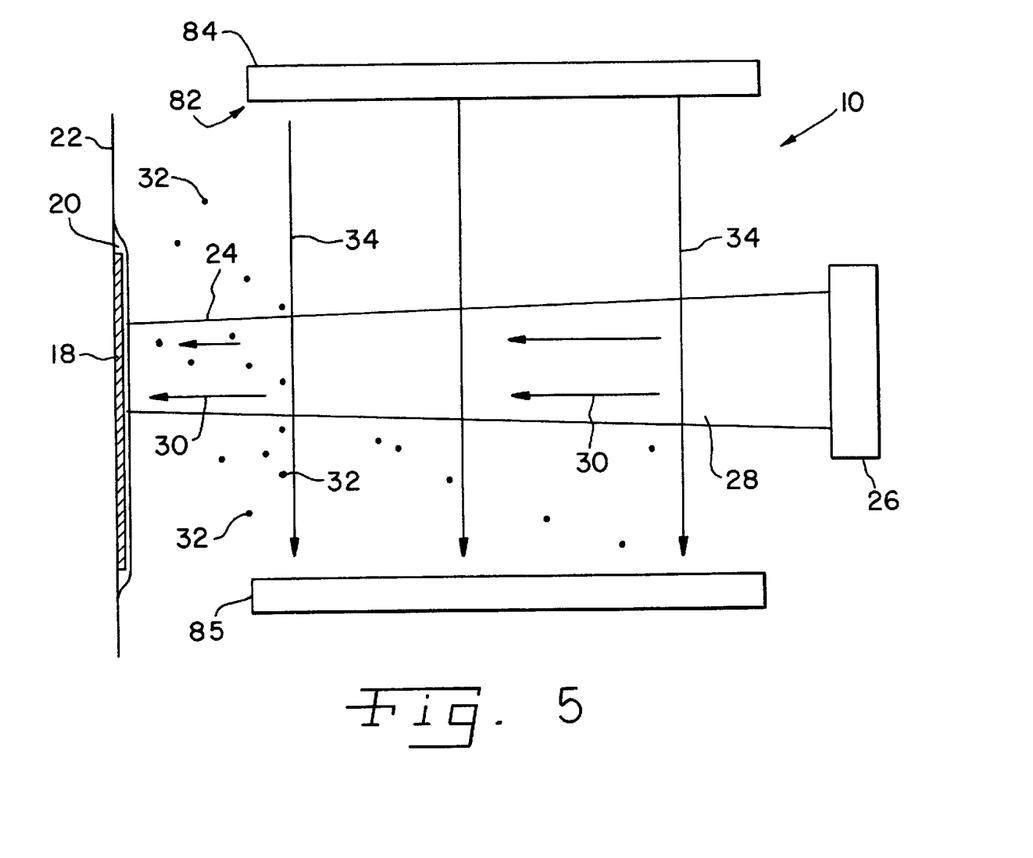
FIG. 5 is a cross-sectional, diagrammatic view of the present invention depicting an gas sweeper.

Referring now to FIG. 5, gas sweeper 82 comprises laser beam clearing means 10. Gas sweeper 82 is composed of gas source 84 which supplies gas 34 across laser beam path 28. As gas 34 traverses the space between gas source 84 and exhaust port 85, gas 34 carries along with it, debris 32. Debris 32 is then evacuated from laser beam path 28 through exhaust port 85. In one particular embodiment, gas 34 is filtered and its humidity is controlled.

Figure 6B:
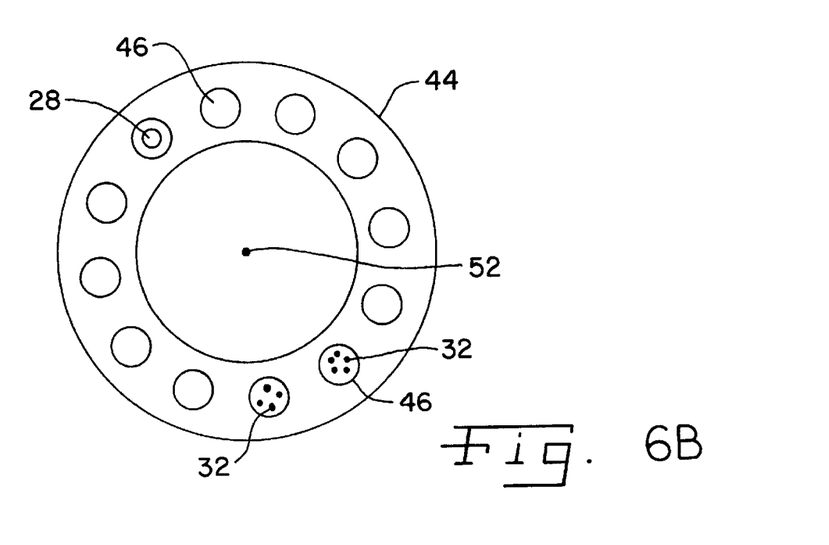

Referring now to FIGS. 6a and 6b, there is shown an annular fixture 44, holding a plurality of annularly disposed tubes 44 which comprises laser beam clearing means 10 of another embodiment of the present invention. Annular fixture 44 is composed of a plurality of tubes 46. Although not necessary for the functionality of this embodiment, tubes 46 may include gas inlet 48 and gas outlet 50. Gas inlet 48 and gas outlet 50 assist in the removal of debris 32 from tube 46. For example, gas may be pushed through tube 46 from gas inlet 48 and out gas outlet 50 thereby clearing tube 46 of debris. Alternatively, debris 32 will settle naturally without assistance, resulting in a debris-free tube 46.

The plurality of annularly disposed tubes 46 rotate about axis 52. Laser beam path 28 passes through one of the tubes 46. During the operation of this invention, the plurality of annularly disposed tubes in fixture 44 rotates to selectively align one tube 46 to allow laser beam path 28 and laser pulse 24 to pass therethrough.

During the operation of this invention, laser beam 28 passes through one of the tubes 46. After laser 26 fires a laser pulse 24, the plurality of annularly disposed tubes 44 rotates about axis 52 whereby aligning a second tube 46 with laser beam path 28. Any debris 32 which may have become dislodged from overlay 18, 20 will be captured in the previous tube 46. The replacement tube 46 will be clear of debris, allowing laser beam 24 to traverse therethrough without encountering any debris 32. There is a sufficient number of tubes 46 to ensure that by the time the first tube has cycled around, any debris which may have entered the tube will be removed or settled out prior to the tube being reused as a laser beam path 28.

Figure 7:
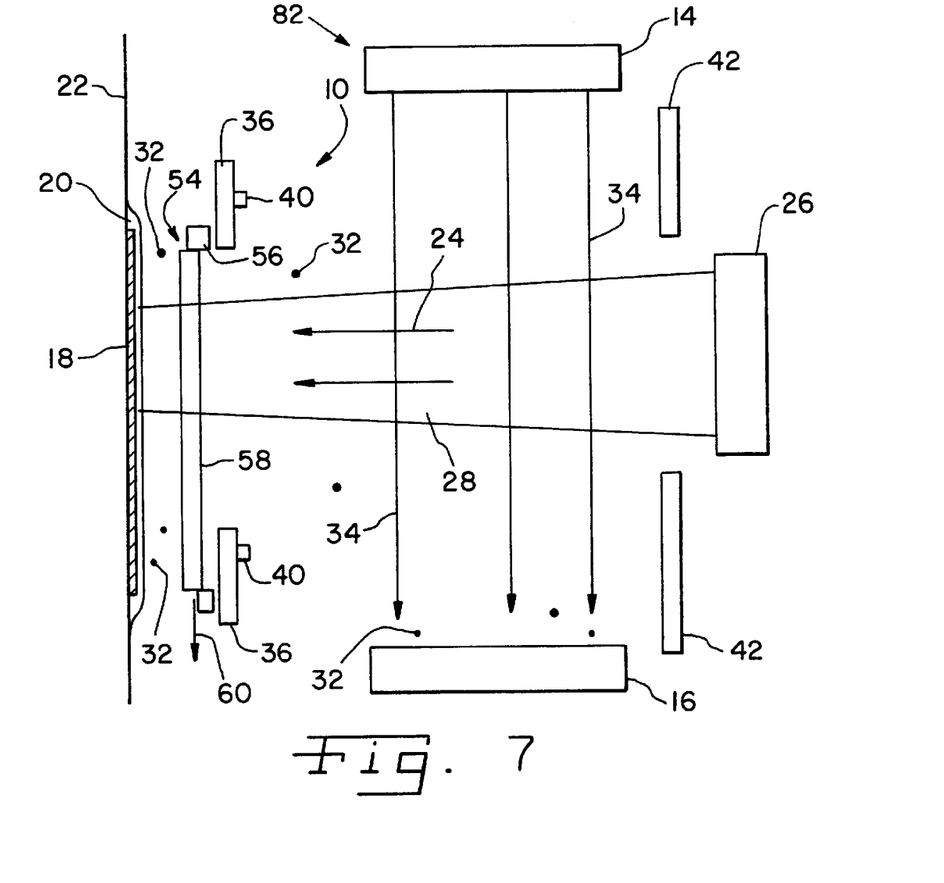
FIG. 7 is a cross-sectional diagrammatic view of a laser beam path and shield according to one embodiment of the present invention.

Referring now to FIG. 7, there is depicted another embodiment of the present invention in which shield 54 prevents debris 32 from entering laser beam path 28. FIG. 7 depicts one specific embodiment in which shield 54 is a mechanical shutter 56. Mechanical shutter 56 can open to form shutter aperture 58 which allows laser beam 24 to pass therethrough. After laser pulse 24 traverses shutter aperture 58, mechanical shutter 56 closes whereby preventing all or most of debris 32 from entering laser beam path 28. Shield 54 is composed of any solid material which will prevent debris from entering the laser beam path.

Alternatively, shield 54, rather than opening and closing, shield 54 is selectively actuated in and out of laser beam path 28 as depicted by arrow 60. When a pulse of coherent energy 24 is sent from laser 26 to workpiece 22, mechanical shutter 56 moves in direction 60 thereby providing an uninterrupted laser beam path from laser 26 to workpiece 20. After laser pulse 24 is sent to workpiece 22, mechanical shutter 56 returns to its closed position, i.e., moves in the direction opposite of arrow 60 whereby preventing debris 32 from entering laser beam path 28.

The embodiments of the present invention with shield 54 may also incorporate the various laser beam clearing means of the previous embodiments such as gas knife 12, gas column 38, a plurality of annularly disposed tubes 44, and gas sweeper 82. These would function to remove any debris 32 that entered the laser beam path 28 before the shield 54 closed the beam path after laser pulse 24 passed through.

Gas sweeper 82 may operate with exhaust port 86 being connected to a vacuum source or exhaust fan (not shown) to apply negative pressure to assist in the removal of debris 32. Also, while gas 34 is depicted as being substantially perpendicular to laser beam path 28, gas 34 needs only to cut across laser beam path 28. Therefore, gas 34 may be at any angle greater than 0 degrees and less than 180 degrees relative to laser beam path 28, whereby allowing gas 34 to traverse laser beam path 28.

FIG. 7 depicts one embodiment of the present invention in which gas sweeper 82 is used in concert with shield 54. Gas sweeper 82 removes any debris 32 which may have entered laser beam path 28.

Figure 8:
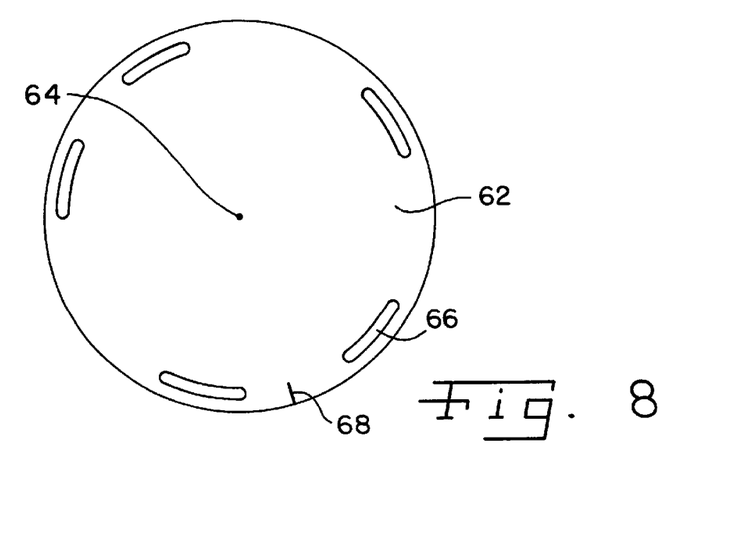
FIG. 8 is a front perspective view of a rotary shutter of the present invention.

Referring now to FIG. 8, shield 54 may be composed of rotary shutter 62. Rotary shutter 62 rotates about axis 64. Axis 64 is substantially parallel to the axis of the laser beam path 28. Rotary shutter 62 rotates to selectively align one of a plurality of rotary apertures 66 with laser beam path 28.

During the operation of this embodiment, a pulse of coherent energy 24 proceeds from laser 26, along laser beam path 28, through rotary aperture 66 and is absorbed by opaque layer 18. Synchronizing mark 68 is used to synchronize laser 26 and rotary shutter 62 such that a pulse of coherent energy 24 is synchronized to pass through aperture 66. Laser beam path 28 is open (i.e., an open path from laser 26 to workpiece 22) when a beam of coherent energy is sent along laser beam path 28, and laser beam path 28 is closed, (i.e., laser beam path 28 is blocked by rotary shutter 62) when laser 26 is not firing.

The size of rotary aperture 66 and the speed by which rotary aperture 62 spins is synchronized to the duration of the laser pulse to ensure that a pulse of coherent energy traverses through rotary aperture 66 and that rotary aperture is in the closed position when laser 26 is not firing.

Figure 9:
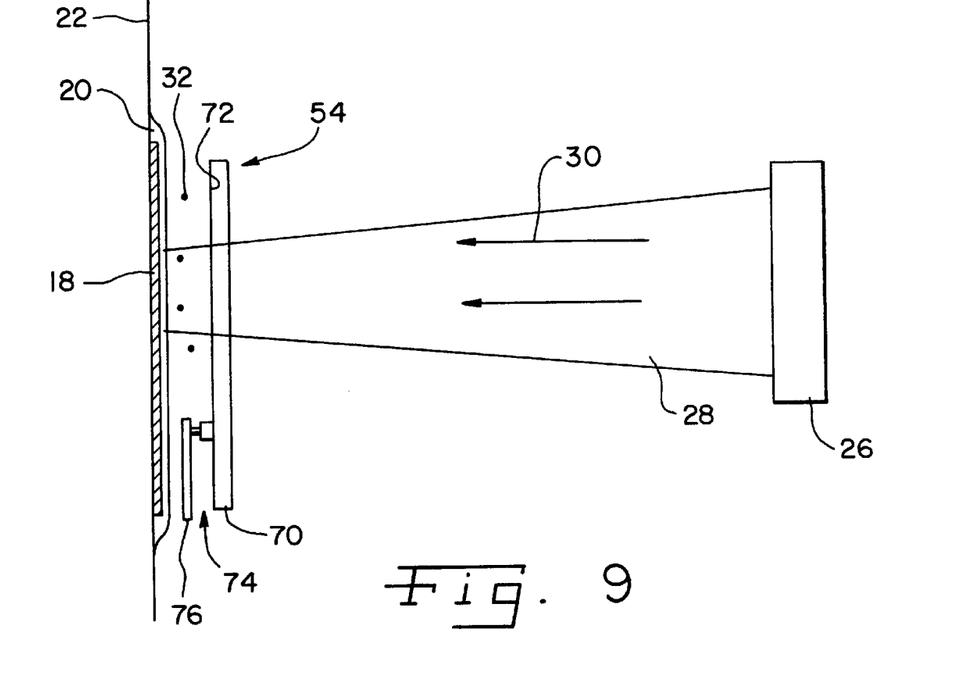
FIG. 9 is a cross-sectional, diagrammatic view of the present invention depicting a transparent shield with wiper.

In another embodiment of the present invention, shield 54 may be a piece of transparent material, such as acrylic 70 (FIG. 9). Since acrylic shield 70 is continuously exposed to possible debris 32, acrylic shield 70 may collect debris 32 on acrylic surface 72. Wiper 74 with wiper blade 76 removes collected debris from acrylic shield 72.

Figure 10A:
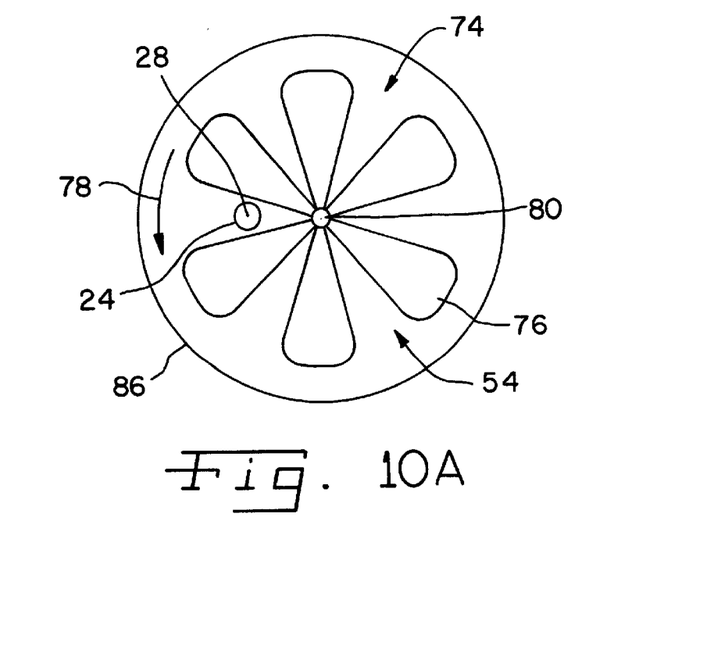
FIG. 10a is a front perspective view of a fan according to the present invention.
Figure 10B:
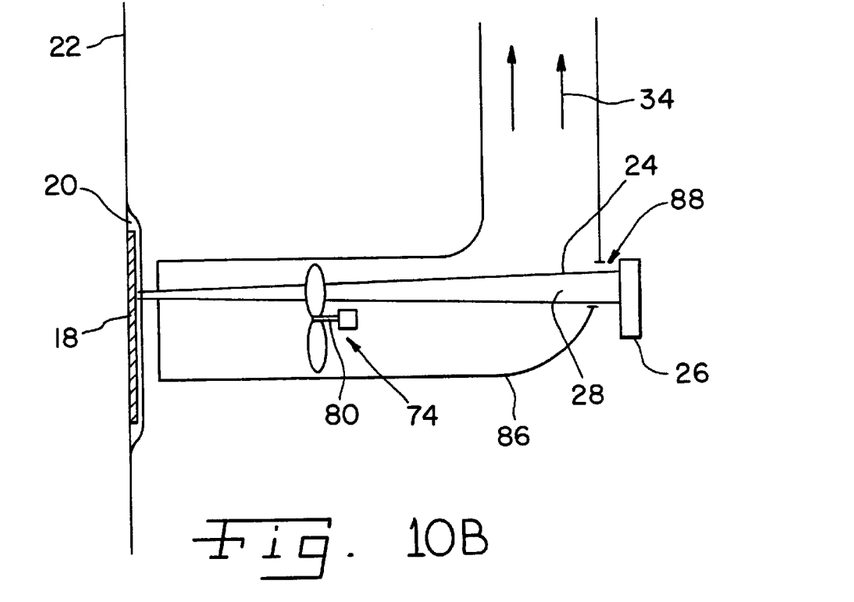
FIG. 10b is a side sectional view of a fan according to one form of the present invention.

Referring now to FIGS. 10a and 10b, shield 54 may be fan 74. Fan 74 contains a plurality of blades 76. Blades 76 are shaped like blades of a fan, i.e., they are twisted such that when fan 74 rotates in direction 78 about axis 80, the plurality of blades 76 produces gas flow. Axis 80 is substantially parallel to laser beam 28. Fan 74 may be located within a port 86.

During the operation of this embodiment of the invention, a pulse of coherent energy 24 is sent from laser 26 along laser beam path 28 through an opening 88 in port 86 between the plurality of blades 76 to workpiece 22. Fan 74 is synchronized such that a pulse of coherent energy will pass between blades 76 and not hit blade 76. As fan 74 rotates, the blades 76 will sweep the debris 32 from the beam path 28 before the next shot. In addition, as fan 76 rotates, fan 74 creates a wind current or an gas current parallel to the direction of laser beam path 28. As a result, any debris which may be present in laser beam path 28 will be removed due to the flow of gas through the port 86. Additionally, a laser beam path clearing means such as an gas knife or an gas sweeper may assist in removing any debris which may have entered laser beam path 28.

Figure 11:
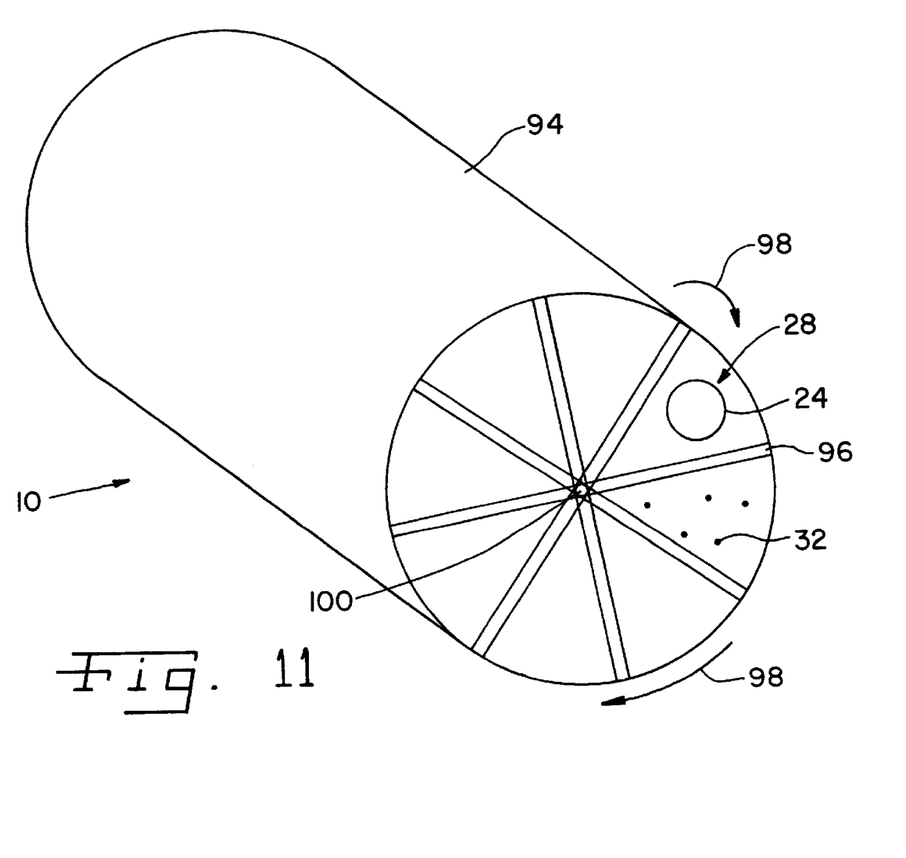
FIG. 11 is a front elevational view of a paddle wheel according to the present invention.

Referring now to FIG. 11, beam cleaning means 10 may be paddle wheel 94. Paddle wheel 94 contains a plurality of paddles 96. Paddle wheel 94 rotates in direction 98 about axis 100 whereby the plurality of paddles 96 produces gas flow. Axis 100 is substantially parallel to laser beam path 28.

During the operation of this embodiment of the invention, a pulse of coherent energy 24 is sent from a laser (not shown) along laser beam path 28 between the plurality of paddles 96 to a workpiece. Paddle wheel 94 is synchronized such that a pulse of coherent energy will pass between the plurality of paddles 96 and not hit paddle 96. As paddle wheel 94 rotates, the paddles 96 will sweep any debris 32 from laser beam path 28 for a subsequent laser shot. In addition, as paddle wheel 94 rotates, paddle 96 creates a wind current or gas current. The air current will be predominantly parallel to the direction of, or perpendicular to, the laser beam path 28 depending on the design of the paddles. As a result, any debris which may be present between paddles 96 will be removed due to the flow of gas. While not necessary for the operation of this embodiment, a flow of gas may be directed through paddle wheel 94 to assist in the removal of debris 32.

Figure 12:
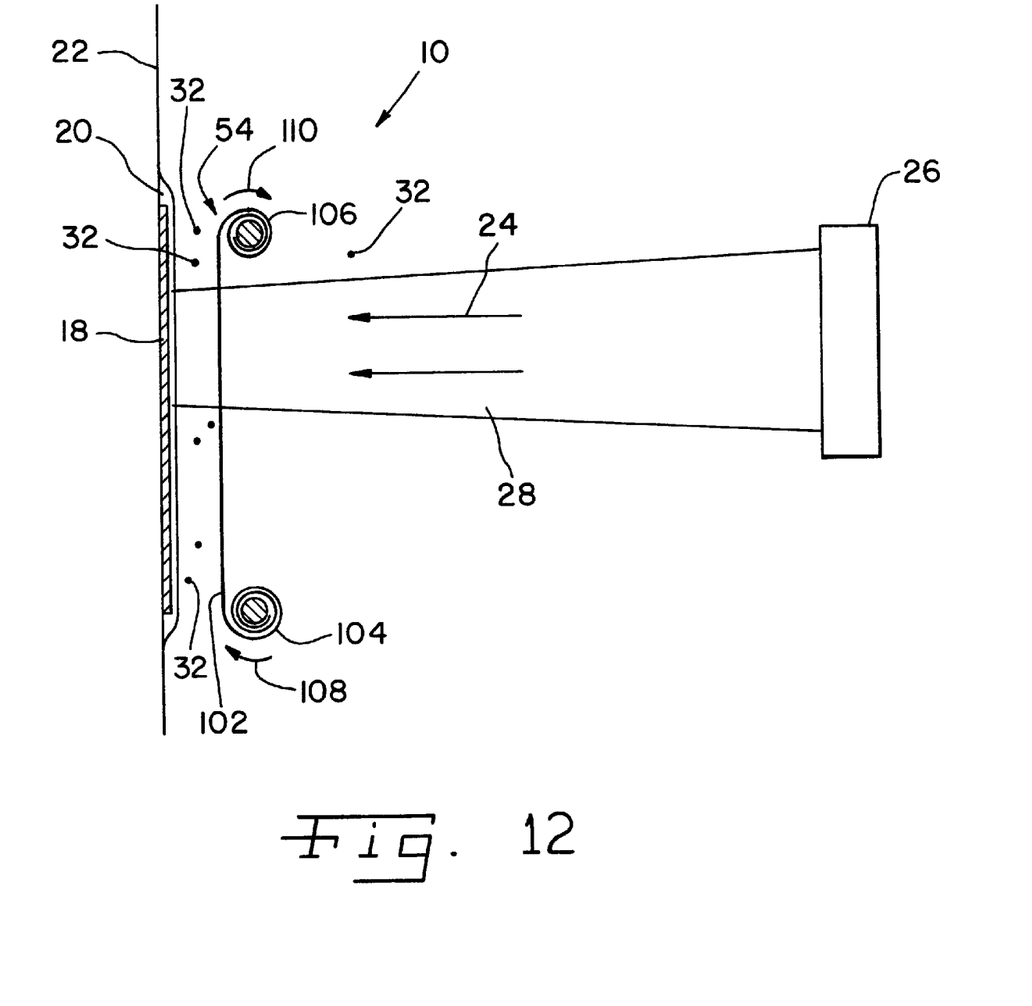
FIG. 12 is a cross-sectional, diagrammatic view of a laser beam path and shield according to one embodiment of the present invention; and Corresponding reference characters indicate corresponding parts throughout the several views. The exemplification set out herein illustrates one preferred embodiment of the invention, in one form, and such exemplification is not to be construed as limiting the scope of the invention in any manner.

Referring now to FIG. 12, shield 54 is composed of transparent film 102. Transparent film 102 is transparent to a pulse of coherent energy 24. Transparent film 102 is advanced from supply spool 104 and taken up by pick-up spool 106. Transparent file 102 may be composed of any material transparent to a pulse of coherent energy such as, but not limited to, transparent mylar.

During operation of this embodiment, a beam of coherent energy 24 is directed to workpiece 22 from laser 26 along laser beam path 28 through transparent film 102 to opaque overlay 18 where the pulse of coherent energy 24 is absorbed. Particulate matter or debris 32 becomes dislodged from overlay 18, 20 and proceed towards laser 26. Some debris 32 will adhere to the surface of transparent film 102. Transparent film 102 is then advanced from supply spool 104 and collected by pick-up spool 106 as indicated by arrows 108, 110, respectively. As a result, debris laden film is picked up by pick-up spool 106 and clean film is advanced from supply spool 104. As a result, debris-free film is available for use by a subsequent laser beam shot.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for improving the fatigue life of a workpiece through laser shock processing which limits laser shock processing debris from interfering with a pulse of coherent energy, comprising:

a laser operatively associated with the workpiece;

a laser beam path running from said laser to the workpiece; and a shield for preventing the laser shock processing debris from entering said laser beam path.

2. The apparatus of claim 1, wherein said shield comprises a mechanical shutter; said mechanical shutter selectively actuated between an opened position and a closed position.

3. The apparatus of claim 1, further comprising a laser beam path clearing means for providing a substantially debris free laser beam path.

4. The apparatus of claim 1, wherein said shield comprises a solid blade.

5. The apparatus of claim 1, wherein said shield comprises a rotary shutter, said rotary shutter having at least one aperture; said rotary shutter rotatable about an axis substantially parallel to said laser beam path, said at least one aperture is selectively alignable with said laser beam path to permit the pulse of coherent energy to traverse said at least one aperture.

6. The apparatus of claim 1, wherein said shield comprises a transparent film.

7. The apparatus of claim 6, further comprising:

a supply spool of said film operatively associated with the laser beam path.

8. The apparatus of claim 1, wherein said shield comprises a sheet substantially transparent to the pulse of coherent energy.

9. The apparatus of claim 8, further comprising a wiper, said wiper operatable to remove debris from said transparent shield.

10. The apparatus of claim 1, wherein said shield comprises a fan having a plurality of blades, said fan rotatable about an axis substantially parallel to said laser beam path, said laser beam path able to traverse said fan between said blades.

* * * * *